United States Patent [19]
Yadav et al.

[11] Patent Number: 5,774,725
[45] Date of Patent: Jun. 30, 1998

[54] METHOD AND COMPUTER PROGRAM PRODUCT FOR SIMPLIFYING CONSTRUCTION OF A PROGRAM FOR TESTING COMPUTER SOFTWARE SUBROUTINES IN AN APPLICATION PROGRAMMING INTERFACE

[75] Inventors: Hanamant K. Yadav, Bellevue; Walter I. Wittel, Jr., Redmond, both of Wash.

[73] Assignee: Microsoft Corporation, Redmond, Wash.

[21] Appl. No.: 672,647

[22] Filed: Jun. 28, 1996

[51] Int. Cl.$^6$ ........................................ G06F 9/45
[52] U.S. Cl. .................. 395/704; 395/701; 395/682; 395/685
[58] Field of Search ................... 395/701, 704, 395/682, 685, 500, 183.14; 364/578

[56] References Cited

U.S. PATENT DOCUMENTS

| | | | |
|---|---|---|---|
| 5,390,325 | 2/1995 | Miller | 395/183.14 |
| 5,600,789 | 2/1997 | Parker et al. | 395/183.14 |
| 5,604,895 | 2/1997 | Raimi | 395/500 |
| 5,608,644 | 3/1997 | Debacker | 364/481 |
| 5,651,111 | 7/1997 | McKeeman et al. | 395/183.14 |
| 5,669,000 | 9/1997 | Jessen et al. | 395/704 |
| 5,699,310 | 12/1997 | Garloff et al. | 395/701 |
| 5,708,774 | 1/1998 | Boden | 395/183.14 |

OTHER PUBLICATIONS

R.P. Seaman "Testing Compiler Operations" IBM Tech. Dis. Bul., vol. 17, No. 11, Apr. 1975, p. 3445.

*Primary Examiner*—Kevin J. Teska
*Assistant Examiner*—Ayni Mohamed
*Attorney, Agent, or Firm*—Workman, Nydegger, & Seeley

[57] ABSTRACT

Method and computer program product for testing software subroutines in an application programming interface. In an exemplary embodiment, a C++ class hierarchy is established for creating a set of intrinsic data element objects containing values of base parameters and a set of list data element objects representing grouped data structures and the subroutines themselves by containing a root-level parameter list for the subroutine, The classes representing each type of base parameter type have associated therewith program code means for creating a user interface for editing the values of such data elements. The list class contains associated program code means for generating a dialog box to display the contents of the grouped data element and provide means to initiate editing of the individual data element values. The data element objects are created by instantiating the appropriate C++ class for a base parameter, grouped data structure, or root-level parameter list. A test program using the C++ class hierarchy that allows easy editing of subroutine values can be quickly and reliably written by instantiating classes to mimic the parameters of subroutines being tested and since the user interface is included. As embodied, the invention lends itself to easy adaptation for nested data structures and for dynamic data allocation situations that are particularly troublesome for test program creation.

18 Claims, 4 Drawing Sheets

Microfiche Appendix Included
(2 Microfiche, 97 Pages)

INTEGER

GENERIC POINTER

POINTER TO AN INTEGER

METHOD AND COMPUTER PROGRAM PRODUCT FOR SIMPLIFYING CONSTRUCTION OF A PROGRAM FOR TESTING COMPUTER SOFTWARE SUBROUTINES IN AN APPLICATION PROGRAMMING INTERFACE

BACKGROUND OF THE INVENTION

A computer program listing which comprises Appendix A is referred to hereinafter in the specification and has been provided on microfiche pursuant to 37 C.F.R. §1.96(b). Appendix A is composed of two microfiche with a total of 97 frames.

1. The Field of the Invention

The present invention relates to systems, methods, programming tools, and apparatuses for testing computer software products and, more particularly, to systems, methods, programming tools, and apparatuses for selectively testing the individual function calls to subroutines that make up an Application Programming Interface ("API").

2. Present State of the Art

Computer software application programs intermingle with and influence the lives of mankind as never before. Such software consists of lengthy and complex sets of instructions that harnesses the raw power of computer processors to achieve desired tasks. The development of such software applications is increasingly important to our economy and the software industry, and the products it produces have evolved from products easily produced in the garage or basement by a single programmer to rigorously engineered and complex offerings that are the result of efforts of hundreds of software developers.

Because of the large numbers of software engineers that may be involved in development of a single software product, it becomes necessary to create a logical description of how the software will operate and how the different pieces will interface one with another. Such an understanding is reduced to a document often known as a specification or system architecture that directs the efforts of the entire cadre of software engineers to a focused end. Errors can be introduced due to improper interpretation of the specification, ambiguous drafting of the specification, logical flaws incorporated within the specification, and other architectural integrity problems from having so many different software engineers involved in the same project.

As a practical matter, a portion of software functionality is made available to other portions of software through a defined interface. This interface, known as a software Application Program Interface ("API"), is typically composed of a number of subroutine calls and data structures that are used in a certain fashion in order to access the functionality of the given software. This API defines the operation of the software to all other pieces of software that will access such functionality and is a natural boundary for testing as explained hereafter.

In order to make the software application reliable for its intended audience, whether that be a commercial distribution of thousands of copies as a major software product offering to the public at large or internal use distribution as a tool to a department sized work group of a dozen people or less, the area of software testing has emerged as the primary vehicle for assuring quality software products and for rooting out and resolving as many bugs as possible. In the field of testing, an attempt is made to exercise the software in as many different ways as possible in order to catch as many programming errors (commonly referred to as "bugs") as possible before "releasing" the software for general use. Bugs not caught before release are very costly to an enterprise both in terms of rectifying the errors and in the loss of goodwill due to perceptions regarding the quality of the software.

Many different levels and types of testing exist for eliminating bugs in computer software, particularly at the commercial level for software that will be publicly distributed on a wide-scale basis. Software testing begins at the programmer level where a software engineer will test all portions of code written to assure that they function as intended. Next, is an independent level that tests the API against a known standard such as the documentation or specification that defines the API. The present invention treats this level of testing and will be elaborated in more detail hereinafter. This level of testing also tests to assure that improper use of the API will result in graceful error handling. For example, it would not be desirable to bring an entire system down when a single user has accessed an API with improper information in a particular subroutine cell.

Next, a completed article or stand alone program of software is tested individually and also in the environment in which it will be running, which is also referred to as system test. The individual test may be actual user testing in the field, also known as beta tests, testing within a commercial software application company's premises by internal testing teams, also known as alpha tests, in addition to being tested by the program developers themselves. System tests help assure that operation of a particular piece of software does not have undesirable side effects in other areas of the system or environment where the software application is running.

A software API is provided by developers of a particular software application or system facility so that other programmers, whether internal to the company or external third party developers, may write additional computer software programs that interface with and take advantage of the facilities or functionality available from the particular application or facility. An API is typically comprised of a number of subroutine calls, specific data requirements to be passed as parameters to the subroutine calls, and instructions or scheme as to the sequence for calling each subroutine with its associated parameters to achieve the desired results. In testing or debugging an API, it is desirable to test each subroutine call individually to assure that it achieves the desired function when passed valid parameters, to test boundary conditions, and to assure graceful exit upon the receipt of invalid or unworkable information through the parameter list.

Because a software tester will want to alter values of the different parameters passed to a given subroutine in order to fully exercise the subroutine according to the above-mentioned goals, the ability to quickly alter the parameter values is important in order to expedite the entire testing procedure. One way to handle the subroutine level testing of an API is to write a custom program that allows the tester to input values for the parameters, to call each subroutine, and examine the results of that call to assure compliance with the written specification of the API. Such custom programs are written to take advantage of graphical user interfaces, including dialog boxes and other system level facilities, to facilitate the software tester's task of exercising completely an individual subroutine by altering or editing the parameters between successive calls.

There are a number of drawbacks associated with writing a custom program from scratch for testing the individual subroutines that make up an API. The greatest of these is the time and expense involved in designing, developing, debugging and maintaining such a custom program. Depending on its capability, a custom testing program may be a significant undertaking and any way of reducing the cost of development by making the program less complex or making portions of it reusable in future programs is a great advantage. Many times, for example, the custom code for one test program may be virtually unusable in any portion of another test program, meaning that each new test program for a particular API must be designed and implemented from scratch in many instances.

One problem that increases the complexity and cost of a testing program is the possibility of nested grouped data. For example, a given subroutine call is passed as parameters a number of different data types. These data types are items such as integer values, strings of characters, single characters, and other such singular data types defined by the language syntax in which the subroutine is written. However, grouped data structures that are provided for logical control and grouping in a computer software program can also be passed as a parameters to a subroutine. Grouped data structures, such as a structure in the "C" programming language, combine a number of the singular data types or even other grouped data structures as part of their group of related data elements.

Because grouped data structures may be nested so as to contain other group ed data structures, including another copy of itself as part of its grouping, writing a test program that will be able to alter all of the possible parameter values used by a subroutine, particularly those values nested below the original root-level parameters by use of grouped data structures, becomes increasingly complex and time consuming. Typically, such a program requires specific customization of the test program code for each subsequent level and for each subroutine to be tested.

Since the number of levels that can be successfully edited must be hard coded into the test program without advance knowledge of the actual number of levels that will be needed, a certain amount of guesswork is introduced. There will be cases when not enough levels are hard coded into the program so that the capability of the test program may be inadequate, while at other times, too many levels will be coded into the test program in anticipation of many levels resulting in excessive time and expense being allocated that will not result in truly added value or functionality to the test program.

Another problem found in current implementations of test programs relates to the use of graphical user interface dialog boxes. The dialog box provides a convenient user operated facility for editing data element values found in the parameter list and grouped data structures. This happens because the operating system does the substantial work in creating the dialog box, providing the user with an easy way to enter the values to be changed, and transmitting the values to the test program. Conversely, however, a significant amount of program development must be expended in order to write source code for accessing these system resources. Furthermore, when a subroutine requires a large number of parameters, or when there are a number of nested levels through grouped data structures, there may be a multitude of differing dialog boxes brought up on a computer display, which makes the screen appear cluttered causing confusion to the test program user and which can impede the efficiency and ease of altering the many different parameter values.

SUMMARY AND OBJECTS OF THE INVENTION

A primary object of this invention to provide a software programming product that allows a software programmer to construct a program for testing individual subroutines in a software interface without having separately to construct the user interface for inputting and editing values of parameters to be passed to the subroutine for each new test program.

Other objects of the invention include: reducing test program complexity and redundancy without giving up functionality; simplifying test program development, thereby reducing the cost of providing a fully functional test program capable of altering the value of all data elements used in subroutine calls that make up an API; providing an appealing and elegant parameter value editing capability to a test program for testing the subroutine of an API; reducing the dialog box clutter associated with known subroutine level API test programs; facilitating the editing of nested grouped data elements without excessive test program design effort; eliminating the need for separate editing facilities for the data elements comprising the parameters to a subroutine and other grouped data elements; and storing and recognizing subroutine parameters in a more convenient way for editing purposes.

It is a feature of this invention to represent a grouped data structure and a list of subroutine parameters in substantially the same way.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and software product is provided for assisting in the construction of programs that test computer software subroutine calls in an API.

The invention as embodied is a general purpose software product that can be incorporated into a specific test program designed to test a particular API and all the subroutines therein. By including this embodiment of the invention into the test program, the writing of the test program is simplified and streamlined so as to save time and money with respect to test program development since many of the user interface issues are already addressed by the present invention.

The embodied invention recognizes two variations of data element objects that are used in mimicking or simulating the parameter hierarchy of a given subroutine within the test programs internal data structure for convenient alteration of parameter values. The first variation consists of intrinsic data element objects that correspond to fundamental types of data or base parameters handled by the subroutines that make up the API. There is an intrinsic data element object type that corresponds to the language defined data types from which all other data elements are constructed. These "building blocks" are such things as integers, floating point numbers, strings, characters, etc., that are typically data types defined by the syntax of a particular programming language. Though intrinsic data element objects based on the data types of a particular programming language syntax are the most flexible and logical basis for creating the intrinsic data element objects, any low-level, building block unit may be defined to be an intrinsic data element object.

The second variation of data element object is the list data element object. This data element object is simply a collection of intrinsic data element objects and/or other list data element objects that are logically related and defined as part of the subroutine to be tested. The list data element object is necessary to allow the invention to fully model the parameter hierarchy of the subroutine. Grouped data structures, such as a structure in the "C" programming language, can be represented by a list data element objects. Furthermore, a subroutine may be represented using the same list data element object.

If the same grouped data structure frequently appears within a particular API, that grouped data structure may also be represented by a designated type of intrinsic data element object. Care should be taken, however, to limit the use of intrinsic data element objects that go beyond the language-defined set of intrinsic data element object type as it is the relatively small set of intrinsic data element object types that give this invention a major benefit.

The present invention also recognizes that, for editing purposes, the data element objects that make up the root-level parameter list passed to a subroutine is equivalent to the data element objects that make up a grouped data structure. Because of this, the same selecting facility can be used for selecting data element objects representing the root-level parameters of a subroutine and the data element objects representing the content of a grouped data structure, thus providing an elegant solution to selecting each and every data element object representing a parameter that will be used for particular subroutine of an API. In this manner, the subroutine itself can be represented by a list data element object.

A single editing means is associated with each intrinsic data element object type and a single list display and selection means is associated with all list data element objects. In this way, all data element objects contained within a list data element object are displayed within a single dialog box and each can be selected so as to operate the editor for the intrinsic data element objects according to intrinsic data element type. Should a list data element object be chosen from the dialog box listing a number of data element objects, another dialog box showing the contents of that particular list data element object can then be brought to the screen. In this way, the total number of dialog boxes can be controlled and dialog box clutter reduced.

A software developer writing a test program will simply create a data element object for each parameter of the subroutine, including data element objects for the contents of a grouped data structure. Additionally, a list data element object will be created for each grouped data structure and for the root-level parameter list to be passed to the subroutine. Further, a software developer will write source code to interconnect the data element objects that have been created so as to mimic the parameter hierarchy of the subroutine with the interconnected combinations of list data element objects and intrinsic data element objects. Finally, the software developer will write code to execute the a subroutine using the mimicked or simulated parameter hierarchy found in the data element objects to recreate the actual parameter hierarchy to be passed to the subroutine using the desired values as input by the test program operator during operation of the test program.

The invention as implemented can also succinctly deal with the issue of variable sized data blocks. For example, a subroutine may require as its parameters a pointer or reference address to a block of data and an integer value specifying the size of that data block. It is impossible at the time of programming to know the actual block size since this value must be varied in order to test the operation of the subroutine on the data block contents. With the present invention, dynamic allocation of data can be programmed into the test program and be easily manipulated by the test program user. Dynamic allocation can also be effectively used for infinitely nested data elements. In this way, a few lines of program code allow the test program user to traverse as many levels as necessary of a nested structure of grouped data structures where the grouped data structure is defined to have a reference to a copy of itself.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
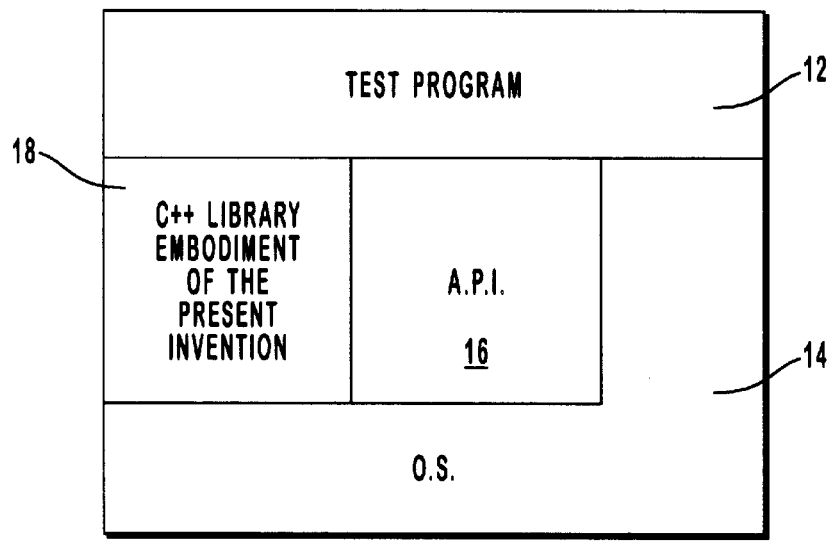
FIG. 1 is a block diagram graphically representing a hypothetical test program organization according to a preferred embodiment of the present invention.

A portion of the disclosure of this patent document contains material to which a claim of copyright protection is made. The copyright owner has no objection to the reproduction by anyone of the patent document or the patent disclosure as it appears in the Patent and Trademark Office patent file or records, but reserves all other rights with respect to the copyrighted work. The copyrighted work appears in its entirety as a program listing found in microfiche Appendix A. It should be recognized that the system and method of the present invention are not intended to be limited by the program listing contained in microfiche Appendix A, which is merely an illustrative example. Additionally, hardcopy reproductions of the parameter editing dialog boxes that make up part of the user interface, created by the program in Appendix A, are attached herewith as Appendix B.

In the following detailed description, the present invention is described by using flow diagrams or structure diagrams to illustrate the processing or the structure that is presently preferred to implement the system and method of the present invention. Using this manner to present the present invention should not be construed as limiting of its scope.

Embodiments within the scope of the present invention also include articles of manufacture comprising program storage means and having encoded therein program code means. Such program storage means can be any available media which can be accessed by a general purpose or special purpose computer. By way of example, and not limitation, such program storage means can comprise RAM, ROM, EPROM, CD-ROM or other optical disk storage, magnetic disk storage or other magnetic storage devices, or any other media which can be used to store the desired program code means and which can be accessed by a general purpose or special purpose computer. Combinations of any of these example program storage means are also contemplated within the scope of this invention. Program code means comprises, for example, executable instructions and data which cause a general purpose or special purpose computer to perform a specific function or functions.

As used herein, the term "subroutine" refers to a conventional building block in software design to logically breakdown the overall function of a program into more manageable units and is "called" by other portions of a program with a list of data parameters.

As used herein, the term "parameter" refers to a data value "passed" to a subroutine that presumably will be accessed during the execution of the subroutine. Parameters are defined by the syntax of the particular computer language and include such basic data types as integers, floating point numbers, strings, etc. as well as programmer defined groupings of data types. The language defined base data types are known herein as "base parameters" while the programmer defined groupings are known herein as "grouped data structures." Parameters also include "pointers" that reference data types and grouped data structures.

As used herein, the term "root-level parameters" refers to the parameters originally passed to a subroutine. A subroutine has a "parameter hierarchy" that begins with the root-level parameters and goes through successive levels depending on the grouped data structures found among the root-level parameters and nesting of group data structures within group data structures.

As used herein, the term "intrinsic data element object" refers to computer data storage resources coupled with program code means to operate on data stored in the data storage resources relating to the lowest levels of information stored by the invention. This will include different types of intrinsic data element objects corresponding to each of the base parameters defined by the language syntax and may include some commonly used group data structures.

As used herein, the term "list data element object" refers to computer data storage resources coupled with program code means to operate on data stored in the data storage resources relating to lists of other data element objects.

The term "data element object" refers to either an intrinsic data element object or a list data element object. Further, a data element object is created or instantiated as needed to represent a base parameter, a grouped data structure, or a subroutine's root-level parameters.

One way of implementing data element objects, including the intrinsic data element objects of the various types and the list data element object, is through instantiation of C++ classes containing the requisite functionality. While a C++ class approach has been taken in a presently preferred embodiment, those skilled in the art will see that there are many other ways to implement data element objects having data storage resources and functionally defined program code means to operate on such data.

A "storage means," "data storage resources," and variants thereof are defined broadly to incorporate any type of device interfaceable to a computer that is used to memorize information and includes both long-term and short-term storage. Thus storage means would include though not be limited to cache memory, RAM, disk storage, tape storage, etc. Furthermore, storage means contemplates the entire system of storage incorporated by a computer in combination so that the RAM, cache, and disk drive together could be considered a storage means. A storage means can also be logically partitioned into different locations so that items are stored in different media or in different parts of the same media. For example, a storage means comprising RAM and disk storage could be logically partitioned so that item A is stored in a portion of RAM (first partition or location), item B is stored in another portion of RAM (second partition or location), and item C is stored on disk (third partition or location).

The entire user interface and implementation of the present invention in one embodiment is incorporated into a C++ programming language class hierarchy composed of four types of classes related in hierarchical fashion. A class library is included in a test program thereby allowing easy access to the incorporated functionality.

Referring to FIG. 1, a test program 12 is written with subroutine calls that will access facilities directly from the operating system 14, the API containing subroutines to be tested 16, and a C++ class library 18 embodying the present invention. All functionality to create the user interface for inputting and changing parameters to be passed to a subroutine is contained in the C++ class library 18 in a class hierarch explained hereafter. In this manner, the writer of the test program 12 need only write program source code to instantiate instances of various classes contained in the C++ class library 18 in order to create intrinsic data element objects and list data element objects corresponding to the parameter hierarchy of the subroutine to be tested. The parameter hierarchy is mimicked or simulated by using class member functions to make the appropriate interconnections as will be explained in detail hereafter.

Once the test program is written and compiled, an operator will be able to use a dialog box in order to see the root-level parameter values that are contained in a top-level list data element object. A particular parameter (as represented by a data element object) may be selected for editing using a mouse or other pointing device.

Figure 2:
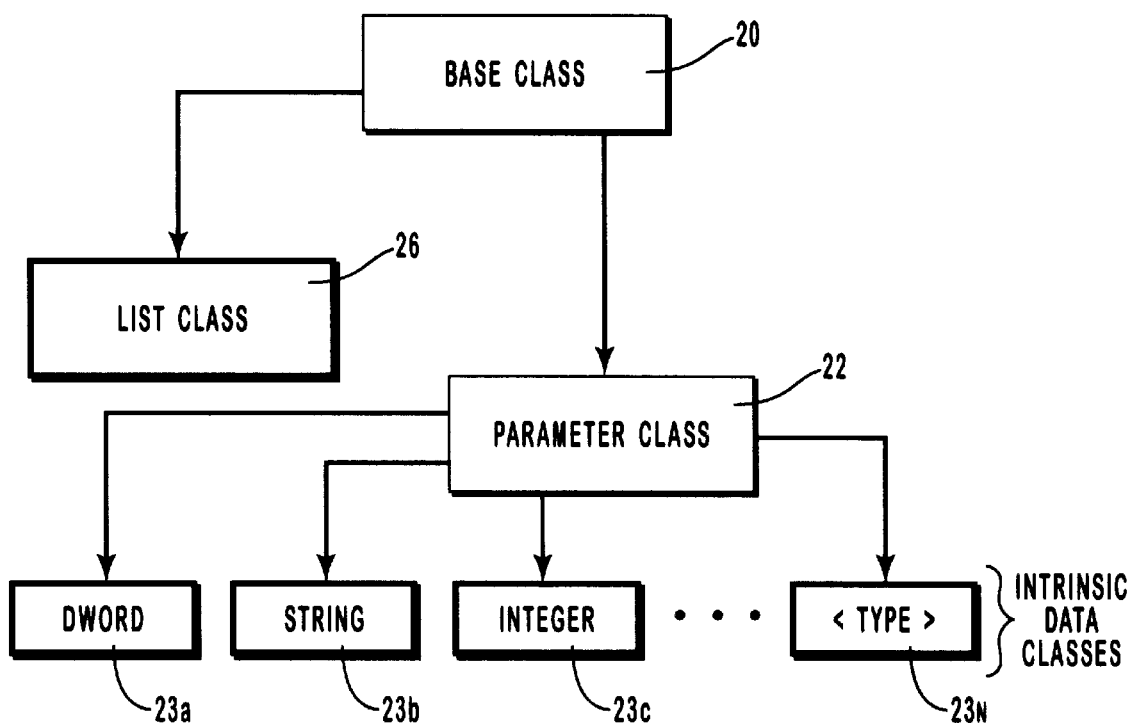
FIG. 2 is block diagram representing the class structure of one presently preferred embodiment of the present invention.

The C++ class library 18 has a class hierarchy consisting of four class types as represented by the block diagram of FIG. 2. The classes actually instantiated by a test program are shown in bold and are the end nodes of the hierarchy. The first class type is a base class 20 that exists to provide a basis for abstracting and deriving the other classes and contains functionality common to every class.

In the base class, via functions are used as placeholders with particular functionality implemented in later derived classes. Examples of such virtual functions include functions used to accommodate calling the subroutine to be tested, editing a given parameter, determining the state of a pointer (if there is one), etc. (See Appendix A for implementation details).

The second class type is derived from the base class 20 and is a parameter class 22 that corresponds to all the common functionality associated with an intrinsic data class. It is an intermediate class to be used to derive further classes. Parameter class 22 contains functionality that is necessary for storing and managing data values representative of base parameters in a subroutine. Such functionality may include a uniform dialog box to be presented to the user through a graphical user interface, facilities for handling pointers to a base parameter, etc. Appendix A contains actual implementation details.

Derived from the common parameter class 22 is a set of classes, the third type of class in the hierarchy, called intrinsic data classes. The intrinsic data classes $23_a$–$23_N$ can be instantiated to create intrinsic data element objects of the appropriate type for all the base parameters in a subroutine hierarchy. There is at least an intrinsic data class for each base parameter type defined by the computer language syntax of the test program and subroutine or API to be tested. Examples are shown in FIG. 2 of a double word base parameter type $23_a$, string base parameter type $23_b$, an integer base parameter type $23_c$, etc.

Each intrinsic data class $23_a$–$23_N$ contains the appropriate storage declarations for storing the actual base parameter value of that type along with a list of alternative values that the program user may select during operation of the test program. Furthermore, each intrinsic data class $23_a$–$23_N$ has associated with it a means for allowing the user to alter the value of the base parameter. Collectively, the ability to alter the base parameter value as well as any enhancements thereto is known as selective editing capability.

All functionality associated with providing a graphical user interface and editing capabilities are incorporated into the particular intrinsic data class definition $23_a$–$23_N$ to the benefit of the test program designer. In this manner, a person designing the test program need not worry about any storing, editing, or user interface issues. Furthermore, the complexity of dialog boxes is reduced so that there is less screen clutter.

The number and nature of intrinsic data classes depends foremost on the intrinsic data types supported by the programming language of the subroutine to be tested. See Appendix A for an example implementation containing a number of data types such as integers, strings, and others.

The intrinsic data classes may include more classes than just those corresponding to the base parameters as defined by a computer language syntax. A widely used group data structure, for example, may justify being represented by an intrinsic data class. Reasons for creating such expanded intrinsic data classes include common use, ease of editing related data values, and reduction of dialog box clutter.

The fourth type of class, list class 26, allows for the creation of a data element object that readily corresponds to grouped data structures. The list class 26 has a means for storing references to instances of intrinsic data classes as well as instances of a list class 26. In this manner, an instance of a list class 26 functions as a list data element object.

The list class 26 has functionality for displaying the content of a grouped data structure as well as the current value associated with each base parameter therein when the bases parameters are represented as instances of the appropriate intrinsic data class. Furthermore, the list class 26 has functionality for selecting a member of its contents which in turn can be edited by the editor associated with the appropriate intrinsic data class.

An instance of a list class 26 can also be used to represent the root-level parameters that are originally passed to a subroutine, thus representing the subroutine itself. In the current embodiment, the instance of a list class 26 having root-level parameters will be flagged as such so that a button may be selected to actually execute the subroutine with the parameters once the parameter values have been input. The test programmer will write source code to actually execute the subroutine using the data stored in the instance of the list class 26. In this manner, the list class 26 is used to both represent subroutines and grouped data structures. The main distinguishing factor between a list class 26 instance representing a grouped data structure or a subroutine is a class data member that is operated through a class member function.

All parameter editing code is contained in the intrinsic data classes $23_a$–$23_N$ has the appropriate code for editing that particular type of parameter. The list class 26 provides the code means to display the contents of a list class instance (i.e., instances of intrinsic data classes and list classes).

When a user attempts to edit an element of a list class instance, the editing itself is delegated to the actual class instance representing the element. This delegation will propagate through all necessary instances of list class 26 until an instance of an intrinsic data class is encountered that will edit an actual value.

The test program designer may represent an API containing many subroutines as an array of list class 26 instances, one list class 26 instance for each subroutine. An appropriate user interface is designed, such as buttons with each function listed or a scroll box of functions, to allow the test program user to select the desired subroutine for testing.

Those skilled in the art will see many additions that could make the completed test program more robust. For example, automated scripts could be written to automate the test procedure. Also, a tester's interaction with the completed test program could be memorized for forming such a script. Further tools could also be developed to assist in test program design such as a parsing program to make an initial pass at making the necessary instantiations and interconnections between instances.

The intrinsic data classes have facility for storing the actual values of the base parameters according to type as well as for a number of alternative values that the developer of the test program may choose while writing the program. Furthermore, for those base parameter types that are able to be declared in pointer format, the intrinsic data class will have the facility to allow testing of the pointer as well as the data referenced. The test program developer will use class member functions and object state to indicate pointer status for the instance of intrinsic data class.

Figure 3A:
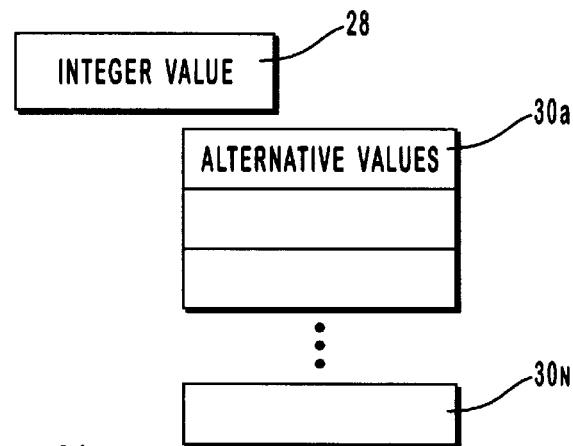
FIG. 3A is a block diagram representing the data storage requirements for an integer parameter.
Figure 3B:
FIG. 3B is a block diagram representing the data storage requirements for a generic pointer.
Figure 3C:
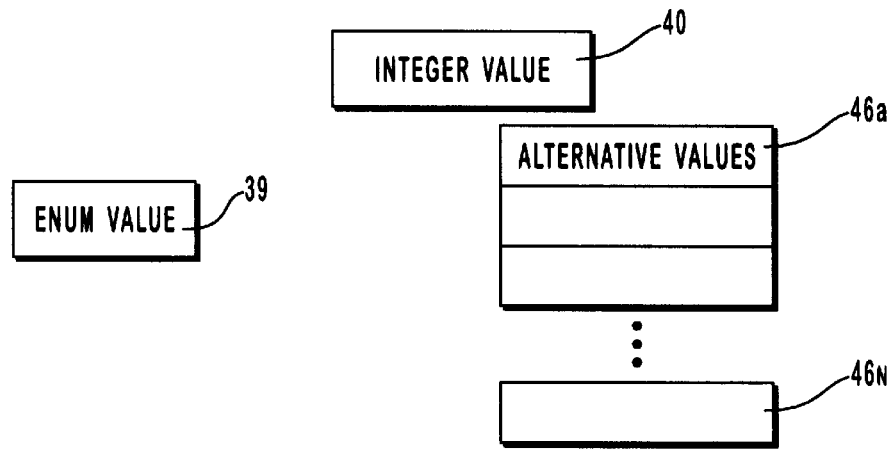
FIG. 3C is a block diagram representing the data storage requirements for a pointer parameter where the pointer specifically points to an integer value.
Figure 4A:
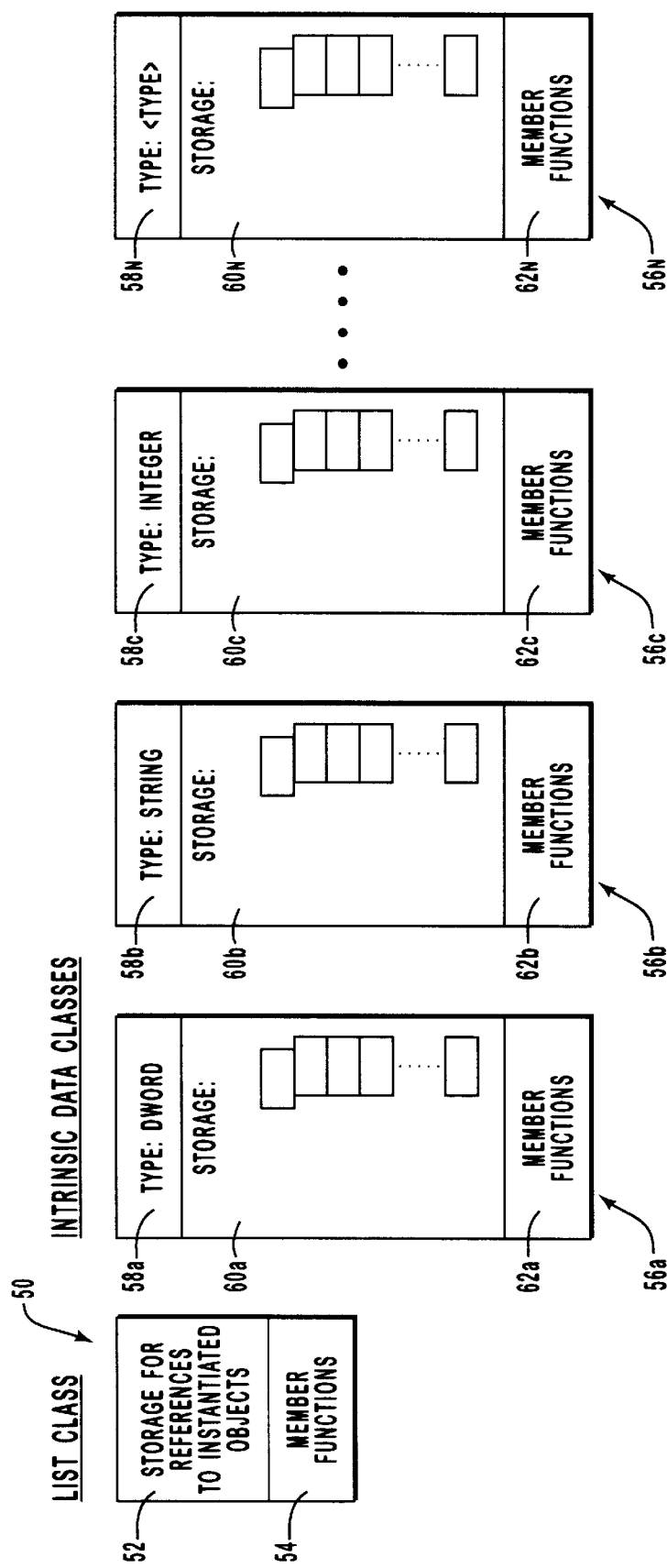
FIG. 4A is a graphical representation of the classes used for mimicking a parameter hierarchy of a subroutine that will be instantiated to create data element objects for the subroutine parameters.
Figure 4B:
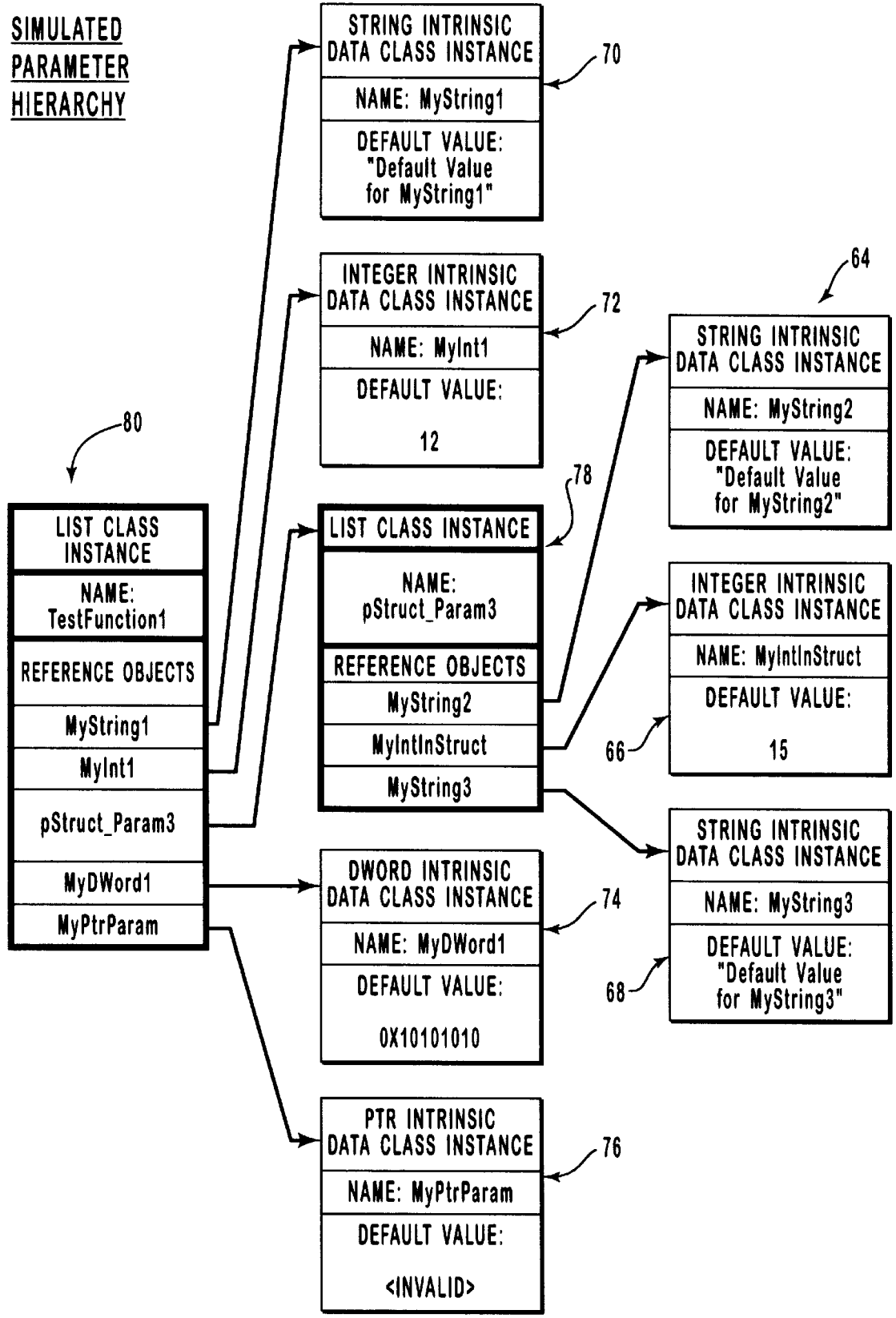
FIG. 4B is a graphical representation of a mimicked or simulated parameter hierarchy using instances of the classes in FIG. 4A as data element objects and interconnected by use of class member functions which are used to set class member variables that maintain the interconnection relationships.

FIGS. 3A–3C graphically illustrate the storage requirements for an integer, a generic pointer, and a pointer to an integer respectively, while FIG. 4A shows the classes that will be used to create a data element object tree to mimic or simulate a subroutine parameter hierarchy. An example of a simulated subroutine hierarchy, to be explained in more detail hereafter, is shown in FIG. 4B.

In FIG. 3A, the integer value is stored in storage location 28 which is the active integer value. This initial number can be set to a default value as part of the instantiation of the intrinsic data class representing an integer, and may be altered through the user interface. It is useful to have a number of alternative values stored within the instance of the integer intrinsic data class as shown by storage locations $30_a$–$30_N$. In this manner, the graphical user interface may be written so that any of the alternative values may be easily selected to thereby ease the efforts of a tester running the test program. When an alternative value is selected, the current integer value is replaced with the alternative value and the previous current integer value is moved down in the list as shown by storage locations $30_a$–$30_N$.

While this example is given for use with an integer, the same storage structure applies for any of the basic data types to which an intrinsic data class is written. Incorporated within the initialization member function of the various intrinsic data classes are the necessary declarations to allocate the appropriate storage from the operating system for the parameter value along with alternatives. The alternatives are entered as part of the original program coding through those skilled in the art could see that files having alternative values could also be used.

FIG. 3B represents a generic pointer that points to nothing in particular. The generic pointer is represented as an enumeration type 33 having different values to represent a valid pointer state, an invalid pointer state, or a null pointer state. The appropriate value may be selected using a radio pushbutton dialog box in a graphical user interface or other such means as is appropriate. This allows the test program operator to easily assess the handling of the subroutine of problems and issues associated with pointers because these three pointer scenarios commonly occur. When executing a subroutine, the test program code will generate actual values corresponding to the pointer state previously selected and this will generally occur at run time. The generic pointer is typically used when a parameter points to a data buffer.

FIG. 3C shows the storage value relationship when there is a pointer to an integer. It may be noted that the same integer class is used for either an integer instance as shown in FIG. 3A or in a pointer to an integer instance as shown in FIG. 3C. A member function of the integer intrinsic data class is used to set a flag signifying whether the instance is for an integer or a pointer to an integer. Likewise, other intrinsic data classes will have similar facility if appropriate.

Again, an enumeration type 39 is used having values representing a valid pointer state, an invalid pointer state, and a null pointer state. The user of the test program will select, through the graphical user interface, the enumeration values representing the pointer state that eventually determines the actual value of the pointer during execution. By having the enumeration type 39, the user need only select the state rather than input the value each time. If a valid pointer state is selected as stored in enumeration type 39, then the editing facility will allow the user to change the integer value stored in location 40, the active integer value. This may be done by directly inputting a new value, or by selecting from a number of alternative values $46_a$–$46_N$.

FIG. 4A graphically shows the functionality of the list class 26 and the intrinsic data classes $23_a$–$23_N$. The list class 50 contains declarations for allocating storage 52 that are actuated when an instance of list class 50 is created. This storage is for references to instances of intrinsic data classes as well as other list class instances. Member functions 54 operate on the data and control the creation of linkages between instances and the placement of instance references into an instance of list class 50. Potential member functions, by way of example and not limitation, can be found in the exemplary source code listing in Appendix A.

Intrinsic data classes $56_a$–$56_N$ are composed of three essential elements: an intrinsic data class type $58_a$–$58_N$ respectively, data storage $60_a$–$60_N$ appropriate to the respective type and pointer ability as explained previously, and member functions $62_a$–$62_N$ for operation of the class. Potential member functions, by way of example and not limitation, can be found in the exemplary source code listing in Appendix A.

A software developer writing source code for a test program that tests a subroutine in a particular API or otherwise, utilizing the present invention as incorporated in a class library preferred embodiment described above, will instantiate instances of a particular intrinsic data class $56_a$–$56_N$ thereby creating an intrinsic data element object for each base parameter. In like manner, the programmer will instantiate instances of the list class 50 to create list element objects that will be used by a particular subroutine. Class member functions are called to place the created intrinsic data element objects (instances of intrinsic data classes $56_a$–$56_N$) into list element objects (instances of the list class 50) with the root-level parameters being represented as a top-level instance of the list class 50.

By simply writing code instantiating the appropriate classes and making the proper connections by use of the provided member functions, the entire editing capability for every parameter value used by a particular subroutine in an API is automatically attained. The top level instance of the list class representing each of the particular subroutines in an API can then be stored as an array of list class 50 instances. After instantiating the classes and making interconnections through the use of the member functions, the test program designer need not do much more programming to have a fully functional test program. To better understand the present invention, an example of test program creation, including a graphical representation of a simulated program hierarchy, is presented that uses a C++ class library to implement the functional aspects of the invention. FIG. 4B shows the mimicked or simulated parameter hierarchy using instances of the list class 50 and the intrinsic data classes $56_a$–$56_N$ as list data element objects and intrinsic data element objects respectively. Throughout the foregoing explanation, the following subroutine call with associated parameter hierarchy is used as an example and an associated test program that could be written according to the present invention is embodied in the program code of Appendix A having the editing dialog boxes illustrated in Appendix B. Though written in C++ source code and also using Microsoft Foundation Classes (MFC) version 3.0, those skilled in the art will appreciate that any computer software language can be used.

```
typedef struct {
          char              MyString2[64];
          int               MyIntInStruct;
          char              MyString3[64];
          } STRUCT;
    TestFunction1(      char              *MyString1;
                        int               *MyInt1;
                        STRUCT            pStruct_Param3;
                        DWORD             *MyDWORD1;
                        void*             MyPtrParam);
```

The previous code segment shows a user-defined group data structure that has been given the data type STRUCT, and a subroutine called TestFunction1 taking as parameters a string named "MyString1," a pointer to an integer named "MyInt1," a STRUCT-type grouped data structure named "pStruct_Param3," a double word named "MyDWORD1," and a generic pointer named "MyPtrParam." Any STRUCT-type grouped data structure such as pStruct_Param3 will contain a string named "MyString2," an integer named "MyIntInStruct," and another string called "MyString3."

One way to write a test program that would test the TestFunction1 subroutine according to the present invention begins with the software developer writing program code to instantiate separate intrinsic data class instances for each base parameter in the parameter hierarchy. In this example, this would include those contained in the root-level parameters as well as those contained in the STRUCT-type grouped data structure.

For the contents of the STRUCT-type grouped data structure parameter, this would include creation of: (i) an instance of a string intrinsic data class for the MyString2 parameter (MyString2 data element object 64); (ii) an instance of an integer intrinsic data class for the IntInStruct parameter (IntInStruct data element object 66); and (iii) an instance of the string intrinsic data class for the MyString3 parameter (MyString3 data element object 68).

Intrinsic data class instances created for the base parameters in the root-level parameter list include: (i) a string-type instance for the MyString1 parameter (MyString1 data element object 70); (ii) an integer-type instance for the MyInt1 parameter (also marked as a pointer by the appropriate member function, and known as MyInt1 data element object 72); (iii) a DWord-type instance for the MyDWORD1 parameter (also marked as a pointer, and known as MyDWORD1 data element object 74); and (iv) a pointer-type instance for the MyPtrParam parameter (MyPtrParam data element object 76).

Member functions of the respective intrinsic data classes would allow the software developer to insert a default value for the base parameter as well as a number of different alternative values that eventually will be user selectable in the final test program for each instance of an intrinsic data class.

The software developer will then instantiate an instance of list class 50 in order to represent the pStruct_Param3 grouped data structure (pStruct_Param3 data element object 78). Member functions of the list class 50 will allow the software developer to reference the instances of intrinsic data classes representing the contents of the pStruct_Param3 grouped data structure into the list class instance.

Another instance of list class 50 would be instantiated or created in order to contain the root-level parameters as represented by instances of the appropriate classes as previously instantiated. These instances corresponding to the root-level parameters would then be inserted into the top-level list class instance (TestFunction1 data element object 80). Next, the TestFunction1 data element object 80 representing the root-level parameters of the TestFunction1 subroutine will be marked through a member function as a function representation as opposed to a grouped data structure representation.

Finally, a software developer will write the source code to actually execute the TestFunction1 subroutine, passing as actual parameters the data values contained in data element objects arranged to simulate the parameter hierarchy as shown in FIG. 4B. Once the software developer has done these relatively rudimentary steps, no source code need be written to declare storage or provide a user interface, thereby streamlining the development of the test program.

Once the test program is written according to the present invention, a set of uniform dialog boxes exist for editing the parameter values as shown in Appendix B. Again, no specific test program code need be written to have such functionality since it is inherent in the data element objects themselves. Accordingly, the data element objects (instances of appropriate class in C++ class library) in simulated parameter hierarchy of FIG. 4B and corresponding dialog box editor/viewer from Appendix B are shown in the following table:

TABLE C

| Data Element Object from FIG. 4B | Viewer/Editor as shown in Appendix B |
| --- | --- |
| TestFunction1 data element object 80 | List class 26 viewer/selector (B-2) |
| MyString1 data element object 70 | String intrinsic data class 23b editor (B-3) |
| MyInt1 data element object 72 | Integer intrinsic data class 23c editor (B-4) |
| pStruct_Param3 data element object 78 | List class 26 viewer/selector (B-5) |
| MyString2 data element object 64 | String intrinsic data class 23b editor (B-6) |
| MyIntInStruct data element object 66 | Integer intrinsic data class 23c editor (B-7) |
| MyString3 data element object 68 | String intrinsic data class 23b editor (B-8) |
| MyDWORD1 data element object 74 | DWORD intrinsic data class 23a editor (B-9) |
| MyPtrParam data element object 76 | Pointer intrinsic data class editor (B-10) |

Those skilled in the art will recognize that instances of the list Class 26 of FIG. 2 will contain references to zero or more instances of intrinsic data classes $23_a$–$23_N$ and references to zero or more instance of list class 26. Furthermore, it will be recognized that instances of the same list class 26 embodied in the present invention can be either a list of parameters, thereby representing an actual subroutine or a list of elements in a grouped data structure.

Additionally, instances of the list class 26 can reference other instances of list class 26 providing nesting of data structures. The nature of the invention describes both a unique approach of implementing subroutine parameter lists and grouped data structures using instances of the same class, and also makes apparent how an implementation of the present invention would provide for nesting of grouped data structures, allowing unlimited nesting without requiring any special code to edit such nested grouped data structures.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product for testing at least one subroutine having a parameter hierarchy of base parameters and grouped parameter structures, the computer program product comprising:

a computer usable medium having computer readable program code means embodied in said medium for testing the subroutine, said computer readable program code means comprising;

means for creating an intrinsic data element object for each base parameter in the subroutine parameter hierarchy according to base parameter type, each typed intrinsic data element object comprising:

means for storing the base parameter value for each base parameter of the corresponding type; and means for creating a common user interface for receiving the values for the base parameters of the corresponding types;

means for creating a list data element object for the root-level parameters of the subroutine and each grouped parameter structure found in the subroutine parameter hierarchy, each list data element object comprising:
  means for storing references to data element objects; and
  means for creating a common user interface for listing and selecting a particular data element object contained within a list data element object; and
means for creating interconnections between the intrinsic data element objects and the list data element objects so that the parameter hierarchy of the subroutine can be simulated.

2. A computer program product as recited in claim 1 further comprising means for traversing the interconnected data element objects to recreate the parameter hierarchy and executing the subroutine to be tested using the recreated parameter hierarchy.

3. A computer program product as recited in claim 1 further comprising:
  means for traversing the interconnected data element objects to recreate the parameter hierarchy and executing the subroutine to be tested using the recreated parameter hierarchy; and
  means for analyzing the results of the executed subroutine.

4. A computer program product as recited in claim 1 wherein each typed intrinsic data element object further comprises means for storing alternative base parameter values and the user interface comprises means for displaying and selecting the base parameter alternative values.

5. A computer program product as recited in claim I wherein the user interface means is a graphical user interface means.

6. A computer program product for use in simplifying the creation of programs for testing at least one subroutine having a parameter hierarchy of base parameters and grouped parameter structures, the computer program product comprising:
  a computer usable medium having computer readable program code means embodied in said medium for simplifying the construction of programs for testing the subroutine, said computer readable program code means comprising;
  means for creating an intrinsic data element object for each base parameter in the subroutine parameter hierarchy according to base parameter type, each typed intrinsic data element object comprising:
    means for storing the base parameter value for each base parameter of the corresponding type; and
    means for creating a common user interface for receiving the values for the base parameters of the corresponding types;
  means for creating a list data element object for the root-level parameters of the subroutine and each grouped parameter structure found in the subroutine parameter hierarchy, each list data element object comprising:
    means for storing references to data element objects; and
    means for creating a common user interface for listing and selecting a particular data element object contained within a list data element object; and
  means for creating interconnections between the intrinsic data element objects and the list data element objects so that the parameter hierarchy of the subroutine can be simulated, so as to simplify the construction of a program for testing the subroutine by unburdening the programmer from writing program code for storing parameter values, creating user interfaces, and editing the parameter values of the parameter hierarchy of the subroutine.

7. A computer program product as recited in claim 6 wherein each typed intrinsic data element object further comprises means for storing alternative base parameter values and the user interface comprises means for displaying and selecting the base parameter alternative values.

8. A computer program product as recited in claim 6 wherein the user interface means is a graphical user interface means.

9. A method of testing a subroutine, the subroutine having a parameter hierarchy consisting of base parameters and grouped parameter structures, the method comprising the steps of:
  creating an intrinsic data element object for each base parameter corresponding to the parameter type comprising the steps of:
    storing the base parameter value for each intrinsic data element object; and
    selectively editing the base parameter value for each intrinsic data element object;
  creating a list data element object for each grouped parameter structure for storing the data element objects corresponding to the parameters contained in the grouped parameter structure including both intrinsic data element objects and other list data element objects according to the parameter hierarchy, comprising the steps of:
    storing references to the data element objects corresponding to the contents of the grouped parameter structure for each list data element object; and
    listing and selecting each of the contained data element objects based on the references for each list data element object; and
  placing references to intrinsic data element objects into corresponding list data element objects to form a data element object hierarchy corresponding to the parameter hierarchy of the subroutine to be tested with a root list data element object corresponding to the root-level parameters of the subroutine.

10. A method for testing a subroutine as recited in claim 9 further comprising traversing the interconnected data element objects to recreate the parameter hierarchy and executing the subroutine to be tested using the recreated parameter hierarchy.

11. A method for testing a subroutine as recited in claim 9 further comprising:
  traversing the interconnected data element objects to recreate the parameter hierarchy and executing the subroutine to be tested using the recreated parameter hierarchy; and
  analyzing the results of the executed subroutine.

12. A method for testing a subroutine as recited in claim 9 wherein each typed intrinsic data element object further comprises:
  storing alternative base parameter values and the selective editing means for each typed intrinsic data element object; and
  displaying and selecting the base parameter alternative values for each typed intrinsic data element object.

13. A method as recited in claim 9 wherein the step of selectively editing the base parameter values is performed through a graphical user interface means.

14. A method of testing a subroutine, the subroutine having a parameter hierarchy consisting of base parameters and grouped parameter structures, the method comprising the steps of:

creating an intrinsic data element object for each base parameter corresponding to the parameter type, wherein each intrinsic data element object comprises: means for storing the base parameter value; and means for selectively editing the base parameter value;

creating a list data element object for each grouped parameter structure for storing the data element objects corresponding to the parameters contained in the grouped parameter structure including both intrinsic data element objects and other list data element objects according to the parameter hierarchy, wherein each list data element object comprises:

means for storing references to the data element objects corresponding to the contents of the grouped parameter structure; and means for listing and selecting each of the contained data element objects based on the references; and placing references to intrinsic data element objects into corresponding list data element objects to form a data element object hierarchy corresponding to the parameter hierarchy of the subroutine to be tested with a root list data element object corresponding to the root-level parameters of the subroutine.

15. A method for testing a subroutine as recited in claim 14 further comprising traversing the interconnected data element objects to recreate the parameter hierarchy and executing the subroutine to be tested using the recreated parameter hierarchy.

16. A method for testing a subroutine as recited in claim 14 further comprising:

traversing the interconnected data element objects to recreate the parameter hierarchy and executing the subroutine to be tested using the recreated parameter hierarchy; and analyzing the results of the executed subroutine.

17. A method for testing a subroutine as recited in claim 14 wherein each typed intrinsic data element object further comprises:

means for storing alternative base parameter values and the selective editing means; and means for displaying and selecting the base parameter alternative values.

18. A method as recited in claim 14 wherein the means for selectively editing the base parameter values creates a graphical user interface means.

* * * * *

UNITED STATES PATENT AND TRADEMARK OFFICE
CERTIFICATE OF CORRECTION

PATENT NO. : 5,774,725

DATED : Jun 30, 1998

INVENTOR(S) : Yadav et al.

It is certified that error appears in the above-indentified patent and that said Letters Patent is hereby corrected as shown below:

Front Page, Abstract, eighth line down, after "subroutine" change the comma to a period Col. 1, line 26, after "that" change "harnesses" to --harness--

Col. 3, line 21, before "parameters" delete "a"

Col. 3, line 27, after "other" change "group ed" to --grouped--

Col. 6, line 19, after "these" change "drawing" to --drawings--

Col. 11, line 14, after "coding" change "through" to --though--

Col. 12, line 29, make "To better understand . . ." the beginning of a new paragraph.

Signed and Sealed this

Sixteenth Day of November, 1999

Attest:

Q. TODD DICKINSON

*Attesting Officer*　　　*Acting Commissioner of Patents and Trademarks*